J. L. FITTS.
VALVE MECHANISM FOR HEATING APPARATUS.
APPLICATION FILED MAR. 13, 1907.
941,703.
Patented Nov. 30, 1909.
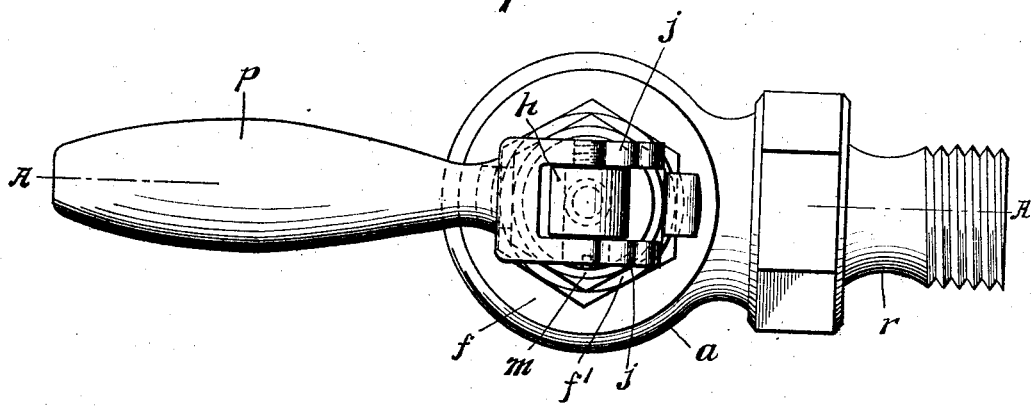
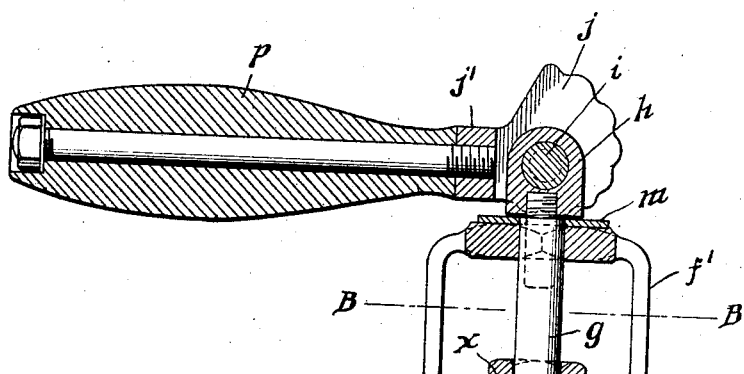
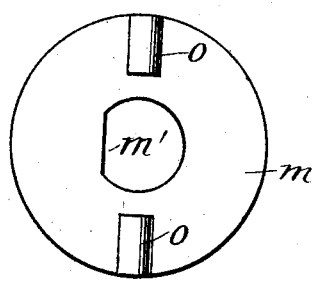
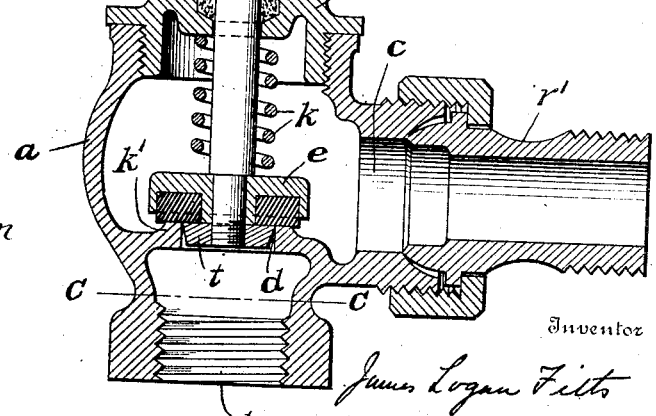
Witnesses
D. Webster, Jr.
R. M. Kelly.
Inventor
James Logan Fitts
By
Attorney

UNITED STATES PATENT OFFICE.

JAMES LOGAN FITTS, OF MERCHANTVILLE, NEW JERSEY, ASSIGNOR TO WARREN, WEBSTER & COMPANY, A CORPORATION OF NEW JERSEY.

VALVE MECHANISM FOR HEATING APPARATUS.

941,703.

Specification of Letters Patent.  Patented Nov. 30, 1909.

Application filed March 13, 1907. Serial No. 362,087.

*To all whom it may concern:*

Be it known that I, JAMES LOGAN FITTS, of Merchantville, county of Camden, State of New Jersey, have invented an Improvement in Valve Mechanism for Heating Apparatus, of which the following is a specification.

More particularly my invention relates to hand controlled or "static" valves for controlling the flow of the heating medium to or from a radiator or other heater, as distinguished from automatically controlled valves.

It is my object to enable the size of the thoroughfare through the valve body to be varied within wide limits to suit the requirements and conditions, and to enable the adjustments to be made with facility and changed at will.

It is also an object of my invention to enable the adjustment of the valve to be observed with ease from any part of the room from which the valve is visible and to enable the valve to be easily adapted to the position of the radiator and the space available.

In carrying out my invention I employ a rocking cam for moving the valve stem which cam is provided with an operating lever or handle, which by its angular position indicates the adjustment of the stem and valve piece. This cam and handle are also arranged to rotate, so that the handle may be placed in any position in the circle or arc of rotation that the position of the radiator and the available space may require.

In the preferred form of my invention I employ a valve stem and valve piece with a spring acting to close the valve piece on its seat; the valve stem is extended through the valve body and is pivotally connected on a transverse axis with an involute cam which acts on the valve body against the spring to move the stem and raise the valve piece when the cam is rocked. Suitable means are employed for holding the cam in adjusted position; these, in my preferred construction, consist of notches on the cam face and an engaging rib on a washer on the top of the valve body.

By employing a rotatable washer the rib will be maintained at all times in position to engage the notched cam face when the cam is rotated to change the position of the operating lever in the arc of rotation.

In the drawings: Figure 1 is a plan view of a valve embodying my invention; Fig. 2 is a vertical section of the same on the line A—A of Fig. 1; and Fig. 3 is a plan view of the top washer.

$a$ is the valve body having the usual ports $b$ $c$, adapted to be connected with the radiator and circulating pipe, and the thoroughfare $d$ controlled by a valve piece $e$. As shown the valve is arranged to be employed as an inlet valve, the port $c$ being connected with the radiator by the usual coupling $r'$, and the port $b$ with the supply pipe. The valve may, however, be used as a return valve, in which case the port $c$ would be connected with the usual return.

$f$ is the usual cap or bonnet closing the open top of the valve body. This bonnet carries a yoke or frame $f'$, and the valve stem $g$ extends through the bonnet and its frame and is connected at the top with a block $h$, through which extends a pin $i$ carried by the involute cam $j$ $j$ arranged above the frame $f'$.

$k$ is a spring between the valve piece $e$ and the bonnet which acts to normally force the valve toward its seat $k'$. The cam $j$ $j$ acts on the upper face of the yoke (or preferably on the interposed washer $m$) and when it is turned it acts to lift the stem $g$ and valve piece $e$, and open the thoroughfare $d$. The faces of the cam $j$ $j$, which is preferably bifurcated as shown, are roughened or provided with notches $n$ so that the cam will maintain the position in which it is placed and thus maintain the adjustment of the valve piece. And for this purpose the rib or ribs $o$ are provided on the washer $m$ to engage the notches of the cam face. The cam $j$ $j$ is provided with an operating lever or handle $p$.

In the construction shown, the cam $j$ $j$ is bifurcated and the connecting yoke or portion $j'$ is threaded to receive the lever $p$; the block $h$ on the head of the stem is between the two cam portions, and the pin $i$ extends through it from one cam portion to the other, and the washer $m$, through which the stem $g$ extends, is provided with a rib $o$ on each side, one under each cam portion.

It is desirable that the cam and its handle should be free to rotate so that the handle may be placed in convenient position depending on the location of the radiator, and it is for this purpose that the ribs $o$ are formed on a washer m. The washer is held on the stem, as by the flat face m', so that it will turn with the cam and thus maintain the ribs o at all times under the cam portions.

It will be apparent that the valve piece may be lifted to any extent desired by moving the cam j j and will be maintained in adjusted position by the engagement of the notches n with the ribs o.

To enable the size of the thoroughfare to be controlled with greater nicety I prefer to employ an annular tapered plug t on the valve piece e and fitting within the orifice. As the cam is moved first one notch and then another this plug is raised in the orifice and provides a gradually increasing annular thoroughfare, until it is wholly withdrawn. When the valve piece e and the plug are raised sufficiently by the cam the maximum opening is afforded and any particles of dirt that may have found lodgment will be released and carried off. Thus the valve may be cleaned at any moment by simply turning the cam to fully opened position.

There is a special advantage in operating the valve by a rocking cam which moves in a vertical plane, since the angular position of the lever in such plane indicates instantly to the eye the adjustment of the valve, and this can be observed from any part of the room from which the lever is in the line of vision. It is never necessary, therefore, to make a close inspection of the valve to ascertain its adjustment.

The yoke or frame f' is used for the purpose of elevating the operating lever and cam and of affording space to give access to the usual packing gland x; it is not however essential, and may be omitted. When it is employed however it may be considered, together with the bonnet f, as a part of the "valve body".

The valve may be used to control the flow of heating medium in either direction—from c to b or from b to c, and either port may therefore be the inlet and the other the outlet. When the flow is from c to b the pressure of the heating medium acts in aid of the spring to close the valve, and when the flow is in the other direction it acts against the spring to open the valve.

What I claim is as follows:

1. A valve device for steam heating apparatus, consisting of a valve-body having a thoroughfare, a valve-piece to control said thoroughfare, a valve-stem for operating said valve-piece extending through the top of the valve-body, and a bifurcated cam having its cam faces acting on a part of the valve-body and arranged to maintain variable positions in its cam surface, the upper end of the valve-stem being pivoted to said cam between its bifurcations on a transverse axis.

2. A valve device for steam heating apparatus, consisting of a valve-body having a thoroughfare, a valve-piece to control said thoroughfare, a yoke carried by the top of said valve-body, a valve-stem for operating said valve-piece extending through the top of the valve-body and yoke, and a bifurcated cam having its cam faces acting on the yoke and arranged to maintain variable positions in its cam surface, the upper end of the valve-stem being pivoted to said cam between its bifurcations on a transverse axis.

3. A valve-device for steam heating apparatus consisting of a valve-body having a thoroughfare, a valve-piece to control said thoroughfare, a valve-stem for operating said valve-piece extending through the top of the valve-body, and an involute cam pivotally connected with the upper end of said stem on a transverse axis and having its cam face bearing on a portion of the valve-body and provided with a series of notches n, said bearing portion being provided with a projection o adapted to engage the notches n and maintain the cam in adjusted position.

4. In a valve for steam heating systems, the combination of a valve body having a thoroughfare, a valve-piece to control said thoroughfare, a valve stem for operating said valve-piece extending through the body, a cam pivotally connected with the upper end of said stem, said stem and cam being free to rotate, a washer adapted to engage said cam and rotate with it interposed between the cam and valve body, and a spring acting on said stem and valve-piece against the cam.

5. In a valve for steam heating systems, the combination of a valve body having a thoroughfare, a valve-piece to control said thoroughfare, a valve stem for operating said valve-piece extending through the body, a rotary washer on the upper part of the valve body embracing said stem and provided with a rib, and an involute cam pivotally connected with the upper end of said stem on a transverse axis and having a notched cam face bearing upon said washer and engaging the rib thereof, and a spring acting on said stem and valve-piece against the cam.

In testimony of which invention, I have hereunto set my hand.

JAMES LOGAN FITTS.

Witnesses:
F. JOSEPH MILLER,
PHILIP Y. QUINN.